US008104175B2

(12) United States Patent
Mochida

(10) Patent No.: US 8,104,175 B2

(45) Date of Patent: Jan. 31, 2012

(54) CYLINDER BLOCK MANUFACTURING METHOD FOR MULTI-CYLINDER ENGINE

(75) Inventor: Hiroaki Mochida, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1103 days.

(21) Appl. No.: 11/809,315

(22) Filed: May 31, 2007

(65) Prior Publication Data

US 2007/0277376 A1 Dec. 6, 2007

(30) Foreign Application Priority Data

May 31, 2006 (JP) ................................ 2006-151392

(51) Int. Cl.
*B23P 11/00* (2006.01)

(52) U.S. Cl. .................... 29/888.06; 29/888; 29/888.01; 29/888.012; 123/41.44; 123/58.1; 123/193.1; 123/195 R; 123/311

(58) Field of Classification Search .................... 29/888, 29/888.01, 888.012, 888.06, 888.061; 123/41.82 R, 123/195 R, 311, 58.1, 193.1, 41.44
See application file for complete search history.

(56) References Cited

U.S. PATENT DOCUMENTS 7,765,975 B2 * 8/2010 Koriyama .................. 123/193.1

FOREIGN PATENT DOCUMENTS

JP 2000-136752 A 5/2000

OTHER PUBLICATIONS

Patent Abstracts of Japan for Japanese Publication No. 2000-136752, Publication date May 16, 2000 (2 pages).

* cited by examiner

*Primary Examiner* — Richard Chang
(74) *Attorney, Agent, or Firm* — Osha • Liang LLP

(57) ABSTRACT

A method of manufacturing a cylinder block for a multi-cylinder engine is disclosed herein. The cylinder block includes a crankcase and cylinder bores disposed therein separated by cylinder walls. The crankcase is adapted to receive a crankshaft and includes crank chambers disposed therein separated by partition walls. Each of the crank chambers of the crankcase corresponds to one of the cylinder bores of the cylinder block. The cylinder bore side of each partition wall has a honing runoff portion thinner in section than the crankshaft side thereof such that a step face results in the partition walls. Further, a runoff groove is formed in the partition walls of the crank chambers, and also a communication hole is formed at least partially within the runoff groove in at least one of the partition walls to enable communication between crank chambers.

13 Claims, 8 Drawing Sheets

[FIG. 1]
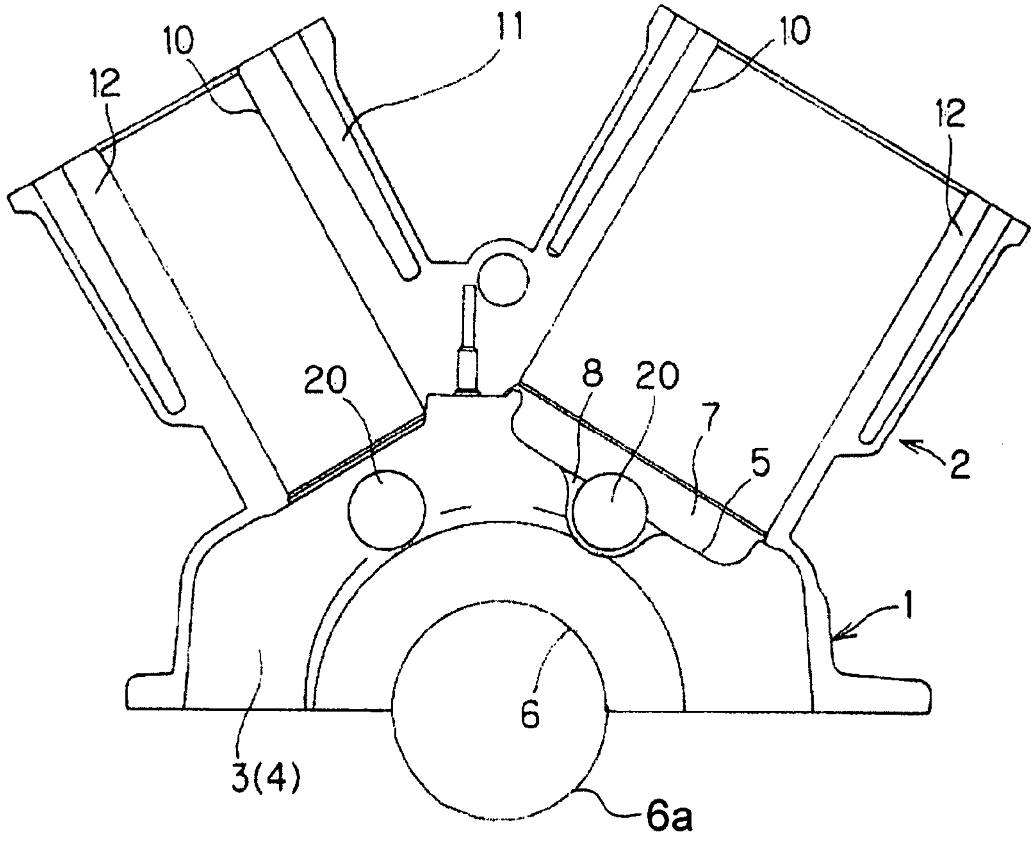

[FIG. 2]
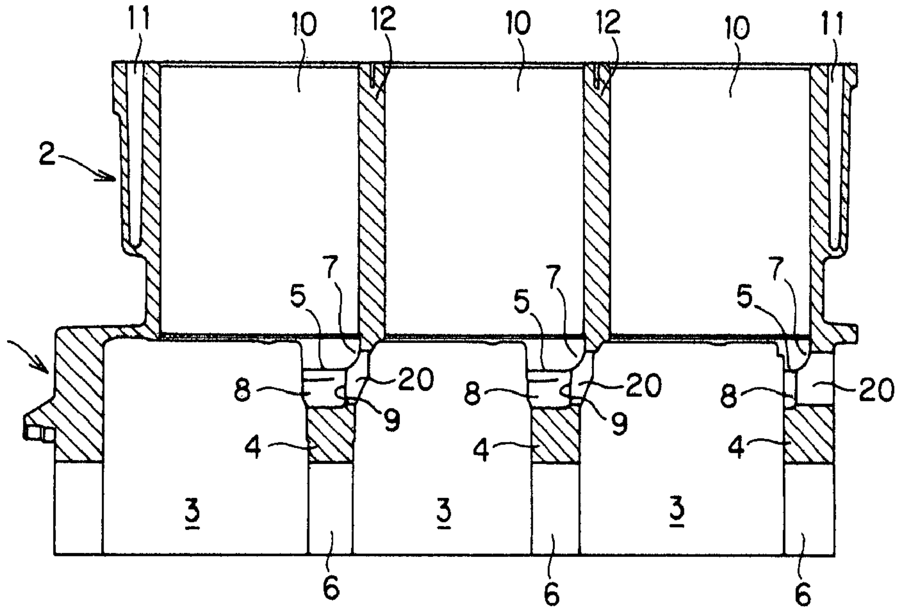

[FIG. 3]
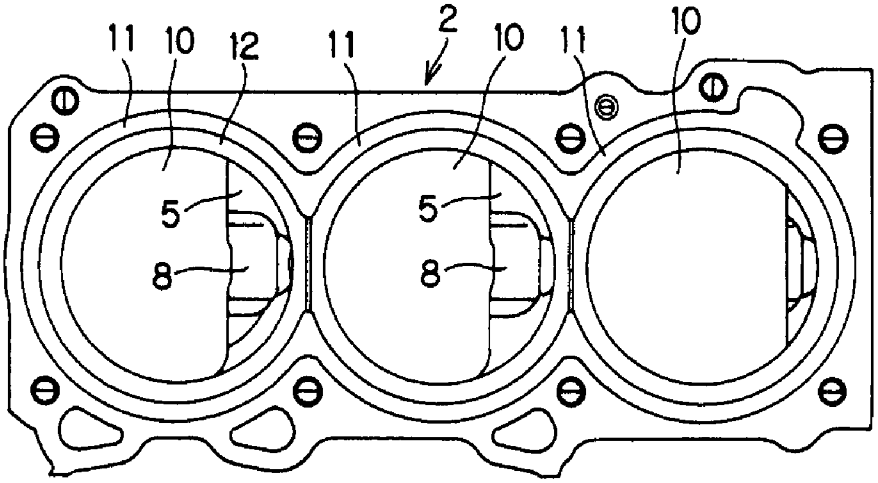

[FIG. 4]
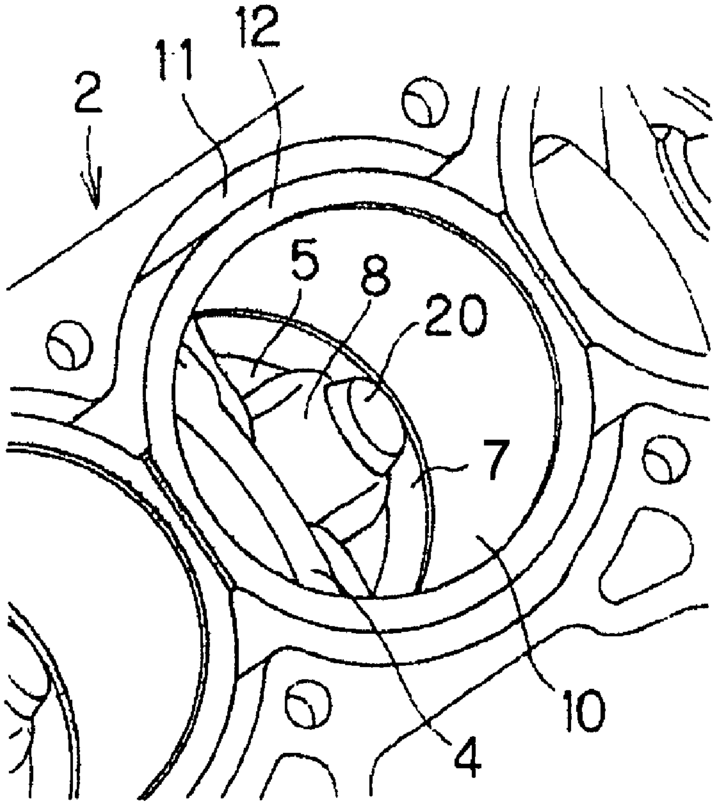

[FIG. 5]
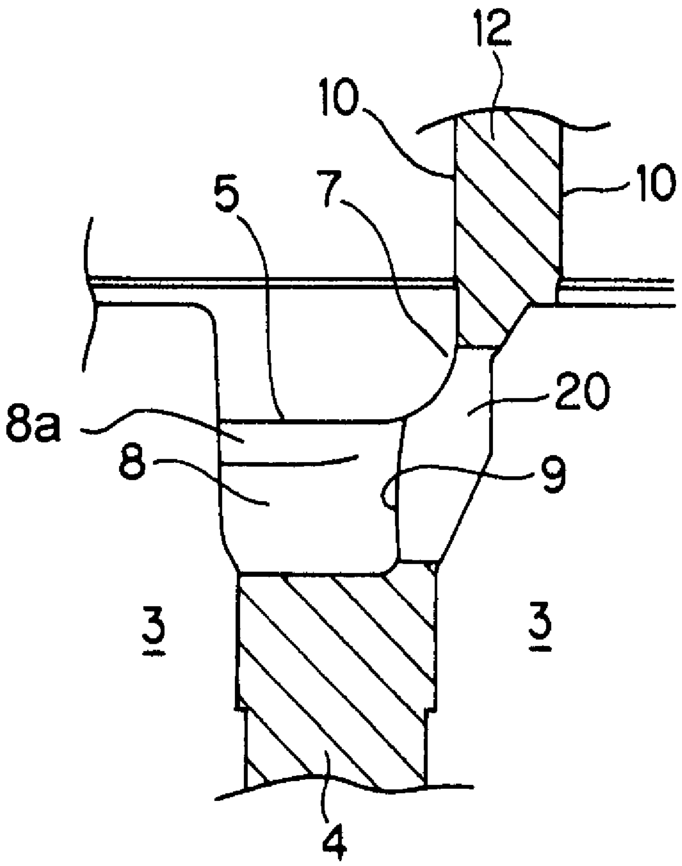

[FIG. 6]
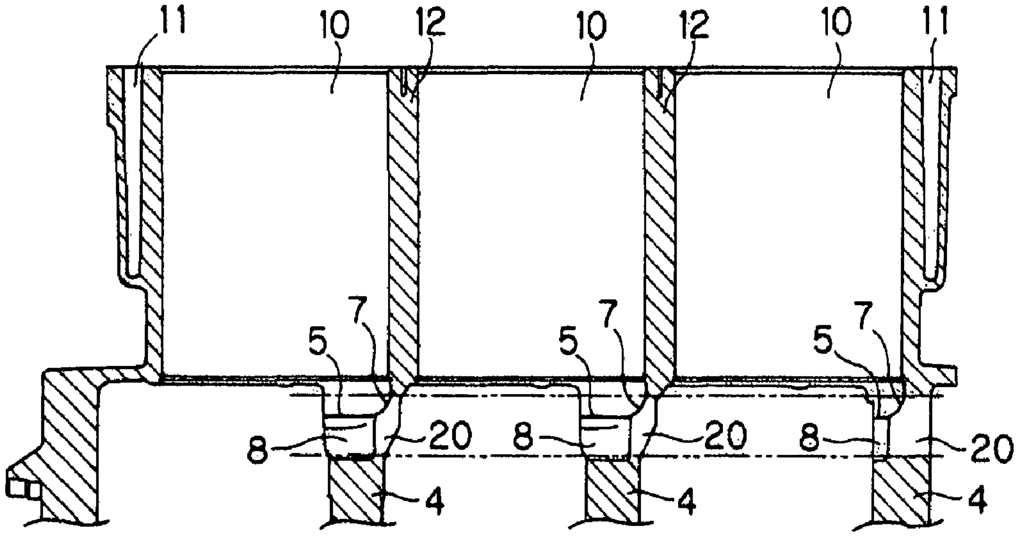

[FIG. 7]
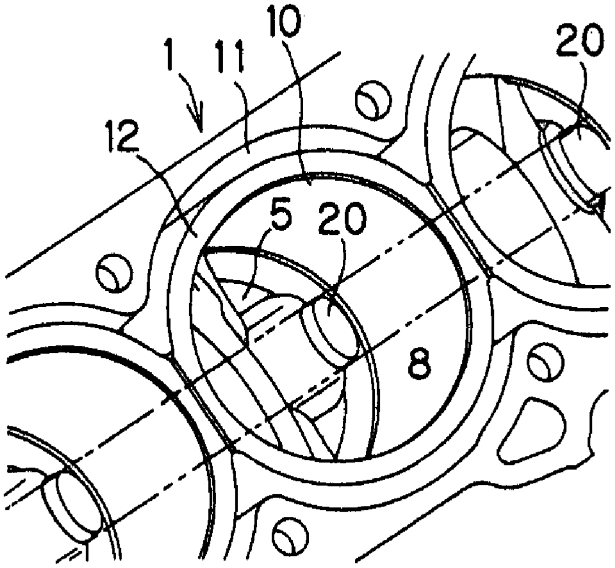

[FIG. 8]
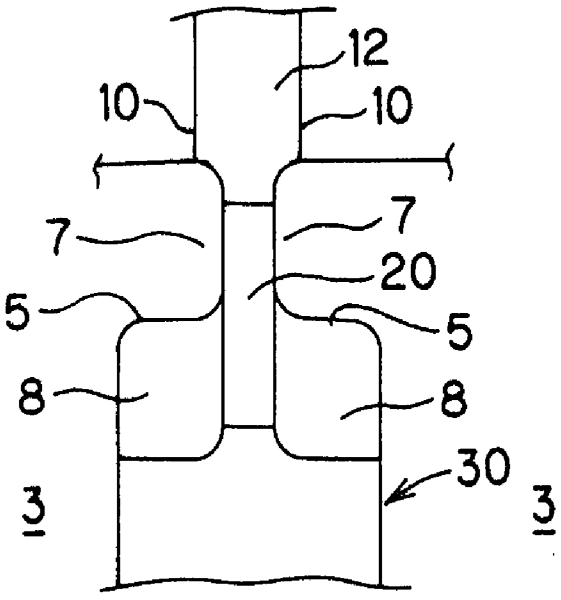

CYLINDER BLOCK MANUFACTURING METHOD FOR MULTI-CYLINDER ENGINE

CLAIM TO PRIORITY

This application claims priority from Japanese patent application No. JP 2006-151392, filed May 31, 2006, the contents of which are hereby incorporated by reference in their entirety.

BACKGROUND OF THE INVENTION

1. Field of the Invention

The present invention relates to a method of manufacturing a cylinder block for a multi-cylinder engine that has a crankcase in which a plurality of crank chambers are aligned with corresponding cylinders in the direction of a crankshaft and the adjacent crank chambers are separated by partition walls. Particularly, the present invention relates to a method of manufacturing a cylinder block for a multi-cylinder engine, whereby ventilating communication holes are suitably formed in the partition walls so that the crank chambers may communicate with one another.

2. Description of Related Art

A conventional crankcase having a cylinder block for a multi-cylinder engine is designed such that a plurality of adjacent crank chambers are aligned with corresponding cylinders in the direction of a crankshaft. Partition walls separating the adjacent crank chambers usually have ventilating communication holes such that the crank chambers communicate with one another. This may help reduce friction by eliminating the problem of changes in internal pressure in any of the crank chambers arising from the reciprocating motion of corresponding pistons increasing with engine speed (refer to Japanese Patent Application Laid-Open No. 2000-136752).

Generally, a cylinder block for a multi-cylinder engine is a Siamese cylinder block designed such that part of each cylinder wall is shared by adjacent cylinder bores. Therefore, each cylinder wall between adjacent cylinder bores is thinner than each partition wall formed in the crankcase. In order to prevent a tool used for honing the cylinder bores from interfering with the partition walls, the cylinder-bore side of each partition wall has a honing runoff portion that is continuous with the corresponding cylinder bore. In other words, each partition wall includes a thin honing runoff portion and a thick partition wall portion extending below from the honing runoff portion via a step.

However, the communication holes defined by thick partition walls may affect the support strength of a bearing provided for a crankshaft. To avoid this, the communication holes may be formed in the honing runoff portions located away from the bearing for the crankshaft. On the other hand, because the larger communication holes reduce the passage resistance of the communication holes, the communication holes are formed across the corresponding thin honing runoff portions and thick partition walls. A machine may be used to form such larger communication holes in the partition walls of a cast cylinder block, parallel to the central axis of the crankshaft. However, the machine may require boring through not only the partition walls with the honing runoff portions, but also the portions including the steps. In this case, the tool may strike against the thick partition walls, thereby decreasing the processing accuracy and yield for the communication holes. In addition, boundaries between the corresponding steps and communication holes form edges, where stress may tend to concentrate. These stress concentrations may limit the size of the communication holes.

SUMMARY OF THE INVENTION

In accordance with an embodiment of the present invention, a method of manufacturing a cylinder block for a multi-cylinder engine is provided. The cylinder block includes a crankcase and cylinder bores disposed therein separated by cylinder walls. The crankcase is adapted to receive a crankshaft and includes crank chambers disposed therein separated by partition walls. The crank chambers of the crankcase correspond to one of the cylinder bores of the cylinder block. The cylinder bore side of each partition wall has a honing runoff portion thinner in section than the crankshaft side thereof such that a step face results in the partition walls. The method further includes forming a runoff groove in the step face of at least one of the partition walls of the crank chambers and forming a communication hole at least partially within the runoff groove in the at least one of the partition walls to enable communication between crank chambers.

Other aspects and advantages of the invention will be apparent from the following description and the appended claims.

BRIEF DESCRIPTION OF THE DRAWINGS

FIG. 1 is a sectional view perpendicular to a crankshaft disposed in a cylinder block for a multi-cylinder engine in accordance with an embodiment of the present invention.

FIG. 2 is a sectional view along the crankshaft of the cylinder block in accordance with an embodiment of the present invention.

FIG. 3 is a top view from a top deck of the cylinder block in accordance with an embodiment of the present invention.

FIG. 4 is a perspective view from the top deck as it faces communication holes in corresponding partition walls in accordance with an embodiment of the present invention.

FIG. 5 is an enlarged view of the main part of each communication hole in accordance with an embodiment of the present invention.

FIG. 6 is a sectional view showing the direction in which holes are bored by a boring tool in accordance with an embodiment of the present invention.

FIG. 7 is a perspective view from the top deck showing the same direction in which the holes are bored by the boring tool in accordance with an embodiment of the present invention.

FIG. 8 is a sectional view of the main part of each of the partition walls of a cylinder block mounted in an in-line multi-cylinder engine in accordance with an embodiment of the present invention.

DETAILED DESCRIPTION

Referring to FIGS. 1 to 4, a method for manufacturing a cylinder block for a multi-cylinder engine is described with reference to the drawings in accordance with an embodiment of the present invention. In the description given below, it is assumed that the top deck of the cylinder block is on the upper side, and the crankshaft on the lower side. Additionally, Like items in the drawing figures are shown with the same reference numbers.

Referring to FIGS. 1 to 4, a crankcase 1 for a multi-cylinder engine in accordance with an embodiment of the present invention is shown. The crankcase 1 may be formed by die casting a light alloy, such as an aluminum alloy, so that the crankcase 1 is integrated with a cylinder block 2 having cylinder bores 10. Specifically, the cylinder block 2 may be such that the cylinder bores 10, possibly surrounded by one or more cooling jackets 11, are disposed in the form of a V shape along the axial direction of a crankshaft 6*a*. As such, the crankcase 1 may be integrally disposed below the cylinder block 2 and may accommodate the crankshaft 6*a*.

Integrally disposed within the crankcase 1 are partition walls 4 (i.e., bulkheads) that may section the interior of the crankcase 1 into crank chambers 3 for the corresponding cylinder bores 10 such that the partition walls 4 are disposed between the cylinder bores 10. In this embodiment, the cylinder bores 10 disposed in corresponding banks forming a V shape are offset with respect to one another in the direction of the crankshaft. As such, cylinder walls 12 between the cylinder bores 10 on both banks may also offset in the direction of the crankshaft. Accordingly, each partition wall 4 is formed such that a step face 5 (i.e., an area surrounded by an arcuate honing runoff portion, described below, and one of the edges of the partition wall 4) facing the corresponding cylinder bore 10 is exposed from one side of the cylinder bore 10, as shown in FIG. 3.

Formed in each partition wall 4 is a semicircular groove 6 to support a crank journal of the crankshaft 6*a* via a bearing metal. In order to prevent a tool for honing the cylinder bores 10 from interfering with the partition walls 4, the cylinder bore 10 side of each partition wall 4 may have a honing runoff portion 7. As such, the honing runoff portion 7 may recede toward the crankshaft 6*a* side of the corresponding cylinder bore 10. In a section in the direction of the crankshaft, the honing runoff portion 7 may be thinner than the crankshaft side partition wall 4. The partition wall 4 is continuous with the honing runoff portion 7 from the step face 5 so as to connect between the cylinder bores 10 through the corresponding cylinder wall 12.

Formed in the middle of the step face 5 of each partition wall 4 is a runoff groove 8 extending in the direction of the crankshaft and having an arcuate section in the direction perpendicular to the crankshaft. A boundary between each runoff groove 8 and the corresponding step face 5 may be connected by a smooth and curved chamfer 8*a*.

The runoff grooves 8 in the step faces 5 of the partition walls 4 of the cylinder block 2 may be formed by die casting. Specifically, each runoff groove 8 may be formed as described below. A projection of an arcuate section is integrally formed in part of the face of a die cast mold and disposed in a cavity in order to form the honing runoff portion 7, and then the casting is removed. By forming the runoff groove 8 by the removal of the casting as described above, a smooth connection with the step face 5 can be made simply by means of the die cast mold. This facilitates the manufacture and restrains shrinkage of the cavity during casting.

A communication hole 20, through which the adjacent crank chambers 3 communicate, is formed in each partition wall 4 so as to extend from an end 9 of the runoff groove 8 in the direction of the crankshaft as far as the honing runoff portion 7. As shown in FIGS. 6 and 7, the communication holes 20 may be formed by a boring process performed by inserting a cutting tool, such as a drill, parallel to the crankshaft from one end of the crankcase 1 in the direction of the crankshaft and then boring through the partition walls 4.

In the boring process, the runoff grooves 8 may be formed in the step faces 5 before forming the communications holes 20 to prevent the cutting tool from being displaced as a result of mis-striking against any step face 5. This allows for greater accuracy in shaping the communication holes 20. This also prevents the lifetime of the tool from diminishing due to stress from such strikes. Further, forming the runoff grooves 8 in advance reduces the processing cost and prolong the lifetime of the tool, in comparison to the case of boring through the partition walls 4 together with the step faces 5.

Further, the chamfer 8*a* formed at each boundary between the corresponding runoff groove 8 and step face 5 can reduce stress concentration, which may be more likely to occur in the case where the boundary between the step face 5 and runoff groove 8 form an edge. This means that a larger inner diameter of the runoff grooves 8 allows a relatively larger diameter of the communication holes 20. The increase in diameter of the communication holes 20 decreases passage resistance in the communication hole 20. Chamfering boundaries between the corresponding step faces 5 and runoff grooves 8 may decrease air-flow resistance around the communication holes 20 and may reduce passage resistance between the adjacent crank chambers 3.

In the foregoing embodiment, a description of a cylinder block for a V-type multi-cylinder engine was given. However, the embodiment can also be applied to a cylinder block for an in-line multi-cylinder engine. Specifically, as shown in FIG. 8, in the cylinder block of the in-line multi-cylinder engine, each cylinder wall 12 between cylinder bores 10 is disposed in the middle of a corresponding partition wall 30 in the direction of a crankshaft. Therefore, it may be necessary for both sides of the partition wall 30 to have step faces 5 that face the cylinder bores 10. By forming runoff grooves 8 in the corresponding step faces 5 by die casting as in the case of the cylinder block for the V-type multi-cylinder engine, the same effects described above can be exhibited.

While this invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method of manufacturing a cylinder block for a multi-cylinder engine, wherein the cylinder block comprises a crankcase and cylinder bores disposed therein separated by cylinder walls, wherein the crankcase is adapted to receive a crankshaft and comprises crank chambers disposed therein separated by partition walls, wherein each of the crank chambers of the crankcase corresponds to one of the cylinder bores of the cylinder block, wherein a cylinder bore side of each partition wall comprises a honing runoff portion thinner in section than a crankshaft side thereof such that a step face results in each partition wall, the method comprising:

forming a runoff groove extending in a direction of the crankshaft in the step face of at least one of the partition walls of the crank chambers; and after the runoff groove is formed, forming a communication hole to enable communication between crank chambers at least partially within the runoff groove in the at least one of the partition walls so as to extend from an end of the runoff groove in the direction of the crankshaft as far as the honing runoff portion.

2. The method of claim 1, wherein the forming the communication hole in at least one of the partition walls comprises forming the communication hole in each of the partition walls.

3. The method of claim 2, wherein the forming the communication hole in each of the partition walls comprises inserting a cutting tool from one end of the crankcase to bore through the partition walls in a direction substantially parallel to the crankshaft.

4. The method of claim 1, wherein the runoff groove is formed with a die cast mold.

5. The method of claim 1, further comprising:

forming a chamfer between the runoff groove and the step face of at least one of the partition walls.

6. The method of claim 1, wherein a cooling jacket is disposed about at least one of the cylinder bores.

7. The method of claim 1, wherein the communication hole is completely within the honing runoff portion and the runoff groove.

8. A method of manufacturing a cylinder block for a multi-cylinder engine, wherein the cylinder block comprises a crankcase and cylinder bores disposed therein separated by cylinder walls, wherein the crankcase is adapted to receive a crankshaft and comprises crank chambers disposed therein separated by partition walls, wherein each of the crank chambers of the crankcase corresponds to one of the cylinder bores of the cylinder block, wherein a cylinder bore side of each partition wall comprises a honing runoff portion thinner in section than a crankshaft side thereof such that a step face results in each partition wall, the method comprising:

forming a runoff groove in the step face of at least one of the partition walls of the crank chambers; and after the runoff groove is formed, forming a communication hole at least partially within the runoff groove in the at least one of the partition walls to enable communication between crank chambers, wherein the runoff groove is formed with a die cast mold.

9. The method of claim 8, wherein the forming the communication hole in at least one of the partition walls comprises forming the communication hole in each of the partition walls.

10. The method of claim 9, wherein the forming the communication hole in each of the partition walls comprises inserting a cutting tool from one end of the crankcase to bore through the partition walls in a direction substantially parallel to the crankshaft.

11. The method of claim 8, further comprising:

forming a chamfer between the runoff groove and the step face of at least one of the partition walls.

12. The method of claim 8, wherein a cooling jacket is disposed about at least one of the cylinder bores.

13. The method of claim 8, wherein the communication hole is completely within the honing runoff portion and the runoff groove.

* * * * *